United States Patent
Wright et al.

(10) Patent No.: US 10,693,997 B2
(45) Date of Patent: Jun. 23, 2020

(54) NETWORK BASED MACHINE LEARNING GENERATED SIMULATIONS

(71) Applicant: SAP SE, Walldorf (DE)

(72) Inventors: Katherine Wright, New Westminster (CA); Sepideh Hashtroodi, Vancouver (CA); Teresa Hsin Yi Su, Vancouver (CA); Flavia Moser, Vancouver (CA); Sajjad Gholami, Vancouver (CA); Zeyu Ni, Vancouver (CA); Geoffrey Neil Peters, Vancouver (CA)

(73) Assignee: SAP SE, Waldorf (DE)

( * ) Notice: Subject to any disclaimer, the term of this patent is extended or adjusted under 35 U.S.C. 154(b) by 132 days.

(21) Appl. No.: 15/844,421

(22) Filed: Dec. 15, 2017

(65) Prior Publication Data
US 2019/0191009 A1    Jun. 20, 2019

(51) Int. Cl.
*H04L 29/08*      (2006.01)
*G06F 40/14*      (2020.01)
*G06F 16/95*      (2019.01)
*G06F 16/958*     (2019.01)
*G06N 20/00*      (2019.01)
*G06F 16/248*     (2019.01)
*G06F 40/177*     (2020.01)

(52) U.S. Cl.
CPC ............ *H04L 67/34* (2013.01); *G06F 16/248* (2019.01); *G06F 16/95* (2019.01); *G06F 16/986* (2019.01); *G06F 40/14* (2020.01); *G06N 20/00* (2019.01); *G06F 40/177* (2020.01)

(58) Field of Classification Search
CPC ....... H04L 67/34; G06F 16/986; G06F 16/248
USPC .......................................................... 709/203
See application file for complete search history.

(56) References Cited

U.S. PATENT DOCUMENTS

| | | | |
|---|---|---|---|
| 8,378,608 B2* | 2/2013 | Robertson | H02M 5/4505 318/438 |
| 8,897,820 B2* | 11/2014 | Marovets | H04W 4/14 455/466 |
| 2012/0271748 A1* | 10/2012 | DiSalvo | G06Q 40/04 705/37 |

(Continued)

OTHER PUBLICATIONS

"Einstein Analytics", downloaded from www.salesforce.com/products/einstein-analytics/overview/, Dec. 15, 2017, Salesforce.com, 5 pages.

*Primary Examiner* — Minh Chau Nguyen
(74) *Attorney, Agent, or Firm* — Fountainhead Law Group P.C.

(57) ABSTRACT

Embodiments of the present disclosure pertain to network based machine learning generated simulations. In one embodiment, the present disclosure includes a computer implemented method comprising sending first code comprising a programmable calculator from a server system to a client system across a network. A data request is sent to a database, the data request configured to retrieve data from the database comprising a plurality of fields and a target field. The retrieved data is processed using a machine learning algorithm to produce a weight for each field of the plurality of fields and a scoring data structure. The fields and the scoring data structure are sent to the client system across the network. A user selects values for the plurality of fields and the programmable calculator is configured based on the scoring data structure to generate a simulated value for the target field based on the user selected values.

19 Claims, 7 Drawing Sheets

(56) References Cited

U.S. PATENT DOCUMENTS

| | | | |
|---|---|---|---|
| 2016/0210882 A1* | 7/2016 | Gulasy | G09B 23/28 |
| 2017/0006135 A1* | 1/2017 | Siebel | H04L 67/02 |
| 2017/0180567 A1* | 6/2017 | Sharma | H04M 15/00 |
| 2017/0351241 A1* | 12/2017 | Bowers | G05B 19/406 |
| 2017/0374414 A1* | 12/2017 | Knox | H04N 21/44218 |
| 2018/0048550 A1* | 2/2018 | Beyah | G06F 15/16 |
| 2018/0075545 A1* | 3/2018 | Richt | G06F 17/5009 |

* cited by examiner

NETWORK BASED MACHINE LEARNING GENERATED SIMULATIONS

BACKGROUND

The present disclosure relates to computing, and in particular, to network based machine learning generated simulations.

Advances in computing technology have led to the increased adoption of machine learning (aka artificial intelligence) across a wide range of applications. One challenge with machine learning is that it is typically computationally intensive. Accordingly, machine learning algorithms are often challenging to implement in light weight applications. For example, implementing a machine learning algorithm on a web browser based system may be challenging and result in poor performance. More specifically, implementing a user driven data simulator based on a machine learning algorithm on a client system can be technically difficult.

SUMMARY

Embodiments of the present disclosure pertain to network based machine learning generated simulations. In one embodiment, the present disclosure includes a computer implemented method comprising sending first code comprising a programmable calculator from a server system to a client system across a network. A data request is sent to a database, the data request configured to retrieve data from the database comprising a plurality of fields and a target field. The retrieved data is processed using a machine learning algorithm to produce a weight for each field of the plurality of fields and a scoring data structure. The fields and the scoring data structure are sent to the client system across the network. A user selects values for the plurality of fields and the programmable calculator is configured based on the scoring data structure to generate a simulated value for the target field based on the user selected values.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
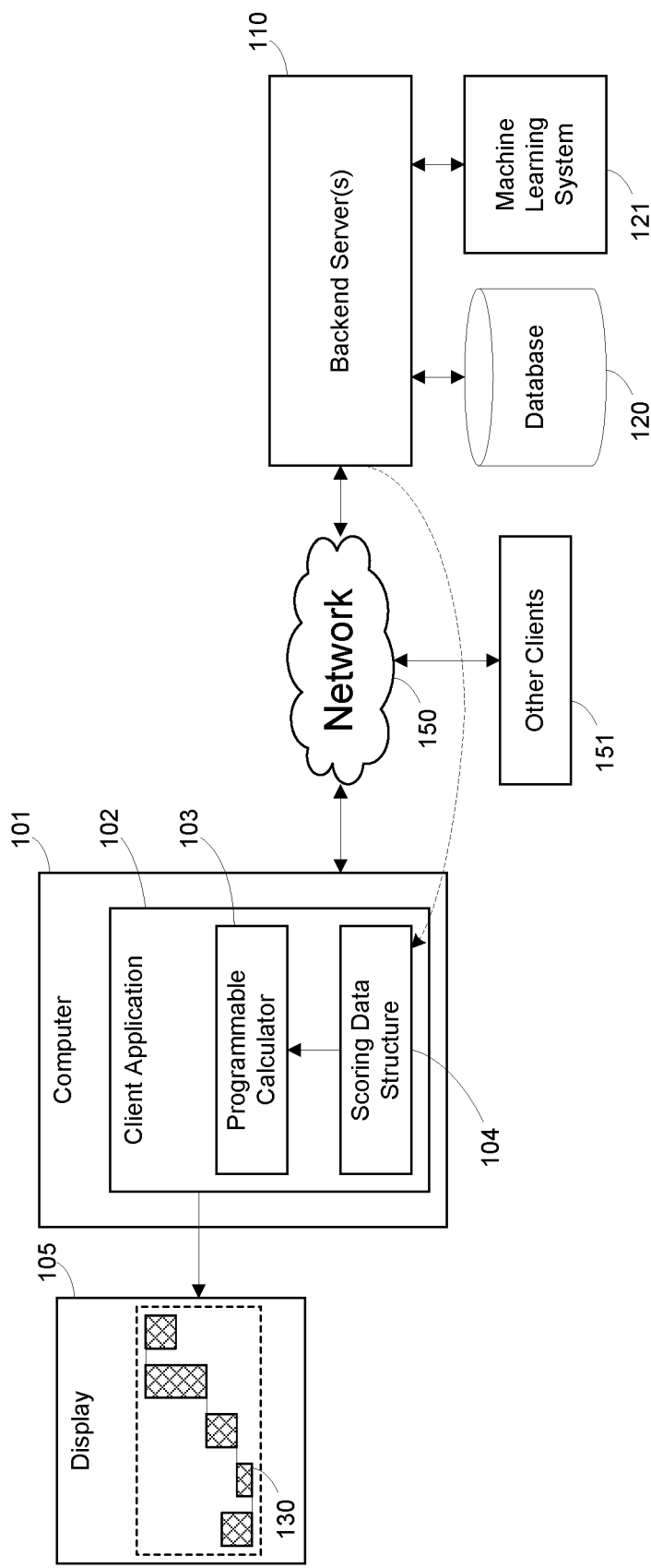
FIG. 1 illustrates network based machine learning generated simulations according to one embodiment.

FIG. 1 illustrates network based machine learning generated simulations according to one embodiment. Features and advantages of the present disclosure include performing machine learning algorithms on data sets on the backend (e.g., on a server system) and generating a data structure that may be sent to a front end (e.g., a client) to allow users to enter inputs and obtain simulated results as if the machine learning algorithm were operating on the front end. Advantages of the present disclosure allow users to run simulations on data and obtain results faster than if the input data were sent to the backend for processing, for example.

FIG. 1 illustrates computer 101 running client application software 102 that interfaces with a backend server 110. A user of application 102 may select a data set in database 120 and send a request from client application 101 to server 110 across network 150 (e.g., the Internet) to retrieve data, for example. In turn, server 110 may send a data request to a database 120. The data request from the server may be configured to retrieve the selected data, for example, from the database, and the data may comprise a plurality of fields and a target field. In one embodiment, the data request may operate on data stored as rows or columns in multiple tables, and return a single table where columns correspond to fields and rows correspond to data records. In one embodiment, the data request may include a query comprising SQL SELECT and GROUP BY operations, as well as other SQL commands or syntax elements, for example.

In some applications, a user may desire to simulate the results of one or more fields if other fields in the data set are changed. For example, a user may desire to see how a "Total Sales" field changes if other fields such as "Licensing Revenue," "Customer Meetings," "Length of Sales Cycle," or "Highest Contact Level" fields change. Embodiments of the disclosure may advantageously execute machine learning algorithms on the data set to determine relationships between the fields. In one embodiment, a relatively lightweight data structure (here, scoring data structure 104) is created and sent to the client, and the client may include a software component (here, programmable calculator 103) that may be configured by the data structure to allow a user to enter new values for various data fields and simulate the changes in other data fields (aka target fields) without sending the new values to the backend for processing by a machine learning algorithm. The techniques disclosed herein reduce the latency of machine learning operations and allow for a faster user experience at the client.

Referring again to FIG. 1, the server system may send code, such as JavaScript, for example, to a client system across a network. The code may include a programmable calculator 103, for example. A user may select a data set from one or more databases 120, and may further select particular fields in the data to be simulated (e.g., target fields). As mentioned above, the client system may trigger a data request to retrieve the desired data and return a table, for example. Server 110 may then trigger a machine learning system 121 to receive the data and process the data using a machine learning algorithm. The machine learning algorithm may determine relationships between the data fields, and in particular, may establish how different fields in the data set related to (or influence) the target fields. For example, changes to particular fields of the data set may cause larger variations in the target field than others. As an example, one field representing the number of sales people in a region may impact sales more than another field representing cellular phone bills of sales people in the same region. In one embodiment, the machine learning algorithm produces weights for each field. The weights may correspond to how much a particular field influences a particular target field, for example. As described in more detail below, the fields may then be ranked based on their influence on the target field (e.g., using the weights) so that the most influential fields may be selected for simulating changes in the target field, for example.

Features and advantages of the present disclosure further include processing the retrieved data using a machine learning algorithm to produce a scoring data structure 104. In one embodiment, the scoring data structure 104 comprises mappings between each field in the data set and the target field. Accordingly, the mappings convert each user selected value for each of the fields into a component target value. In turn, a simulated value may be obtained based on the component target values, for example. In other words, relationships established by a machine learning algorithm may be stored as mappings in scoring data structure 104. The fields (aka input fields or influencers) and the scoring data structure may then be sent from a backend server system 110, across network 150, and to a client computer system 101 to simulate target field values for different values of the input fields.

In this example, client application 102 receives the scoring data structure 104 to configure programmable calculator 103. Programmable calculator 103 may comprise JavaScript, for example, that reads or otherwise access the data in scoring data structure 104 including the mappings as described in more detail below. A user may select different values for the fields, and programmable calculator 104, configured based on scoring data structure 103, generates simulated values for the target field based on the user selected values, for example. As described in more detail below, in one example embodiment, the user selects values for the top N most influential fields to generate simulated results.

Figure 2:
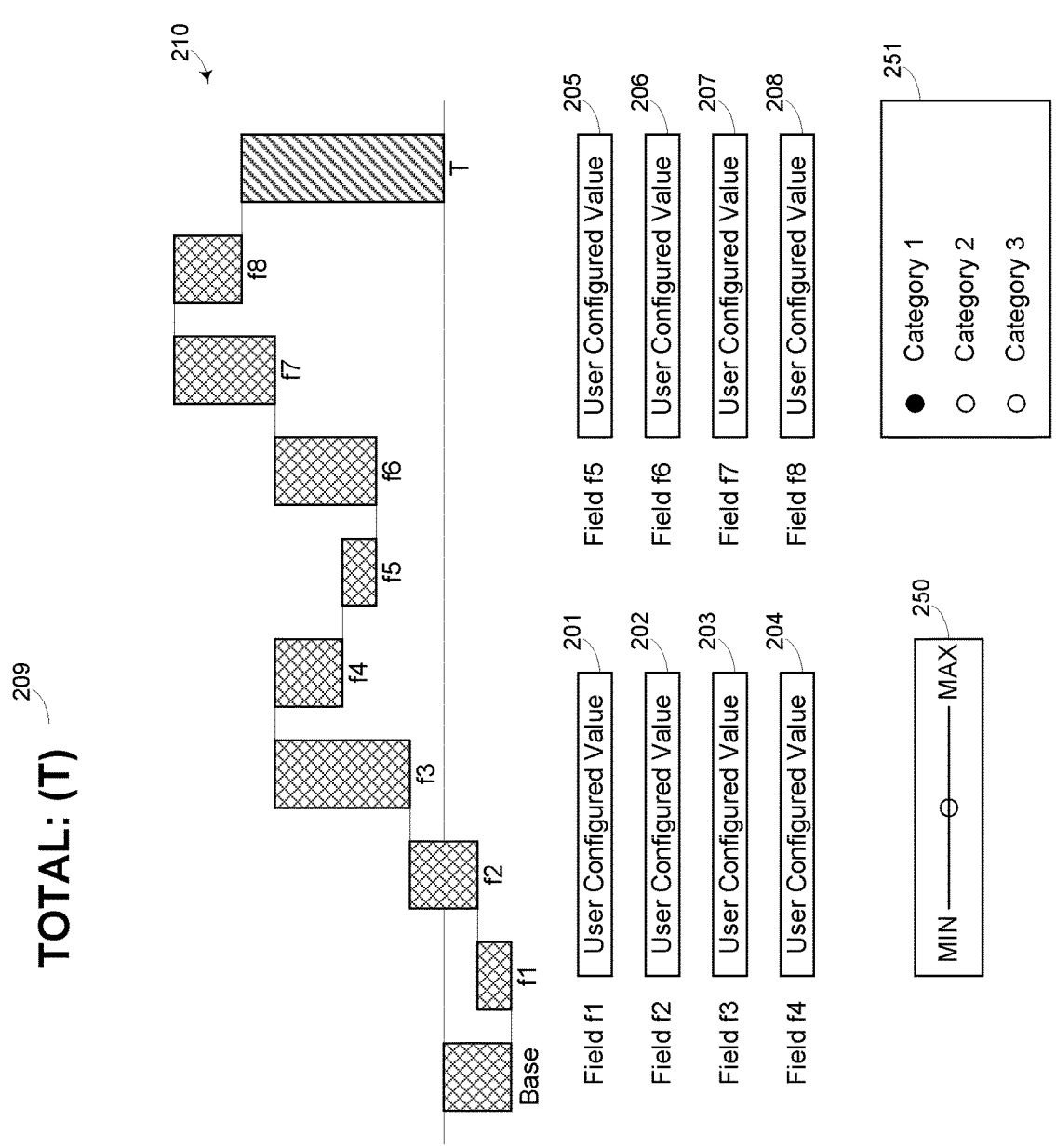
FIG. 2 illustrates a user interface according to an example embodiment.

FIG. 2 illustrates a user interface according to an example embodiment. In this example, a user may be prompted to set values for a variety of fields f1-f8 201-208. In some embodiments, values may be set using a slider 250 (e.g., for numeric input field values) or set using radio buttons for different categories 251 (e.g., for categorical input field values). As described above, the user values are mapped to target field values by mappings read out of the scoring data structure and performed by the programmable calculator, for example. In one embodiment, a user may retrieve web pages of an application using a browser, for example, and a web page may include JavaScript code to implement the programmable calculator. In some embodiments, the scoring data structure may be sent to the client in a JavaScript Object Notation (JSON) file as illustrated with examples below. Other embodiments may use other notations, such as an extended markup language (XML) file, for example. The programmable calculator may retrieve mappings from the JSON file and apply the user input values to the mappings to produce a target field value 209, for example. In this example, the client system displays the simulated value 209 for the target field and a plurality of values 201-208 corresponding to contributions of each of the plurality of fields 201-208 to the simulated value, for example. Here, the simulated value 209 (T) and the plurality of user input values 201-208 are displayed in a waterfall chart 210. In some embodiments, fields 201-208 presented to a user for selection/configuration are the top N fields having the largest weights (fields having the top N highest influence), for example. Other fields from the data set not in the top N fields may be mapped to a base value ("Base") and combined with component target values illustrated in waterfall chart 210 to obtain the simulated value (T) 209, for example. The component target values may be generated from the user input values 201-208 applied to mappings in the scoring data structure as described below.

Figure 3:
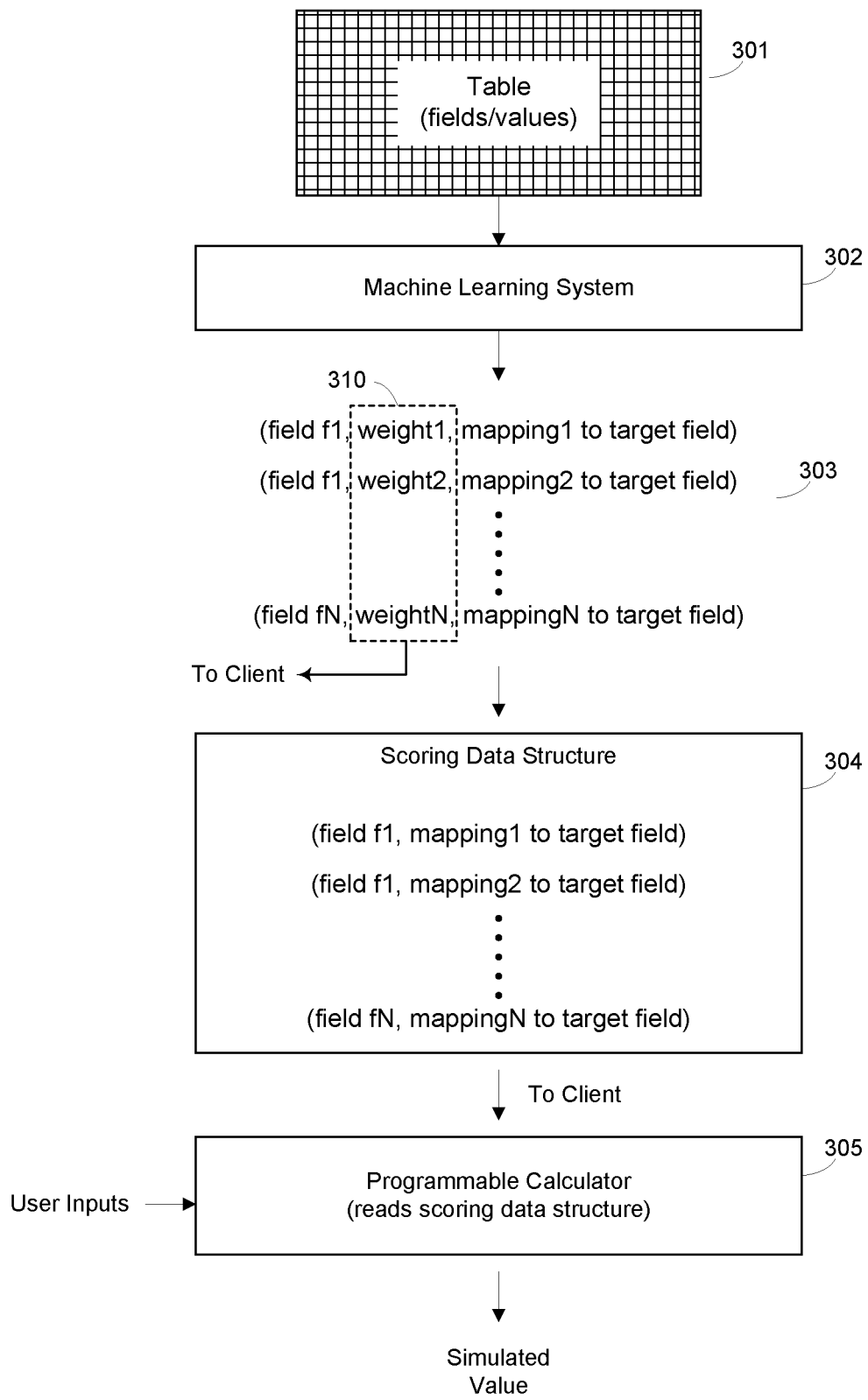
FIG. 3 illustrates a scoring data structure according to an example embodiment.

FIG. 3 illustrates a scoring data structure according to an example embodiment. In this example, a table 301 comprising rows of data and columns defining fields is processed by a machine learning algorithm 302 to produce mappings between each field and a target field as well as weights indicating a contribution of a corresponding field to the target field. Mappings may transform numerical fields, which may have continuous values. Additionally, in other embodiments, mappings may transform categorical values (e.g., represented as text). Categorical values may be sets of values fields may take on, such as {employee, manager, director}, {green, blue, red, brown}, {small, medium, large, X-large}, {United States, Europe, Japan, China}, for example, or any other discrete sets. Embodiments of the present disclosure may map either or both numerical or categorical fields to target fields. Target fields, in turn, may be either a target numerical field or target categorical field, for example. As illustrated below, in some embodiments a mapping may represent a single structure that has multiple logical subcomponents or mapping parts. In this example, weights from the machine learning system 302 may be sent to the client at 310. In this case, the client may present only the top N weighted fields for selection to a user as input fields, for example. Scoring data structure 304 in this example may comprise mappings 1-N for each of the plurality of fields f1-fN. Scoring data structure 304 may be sent to a client as a JSON object, for example, and the mappings and other information stored therein may be used to configure a programmable calculator implemented as JavaScript, for example. The mappings may convert each user selected input value for each of the input fields, which may only include the top N fields of f1-fN, for example, into component target values. The simulated value for each set of user input values mentioned above may be based on the component target values, for example.

Figure 4:
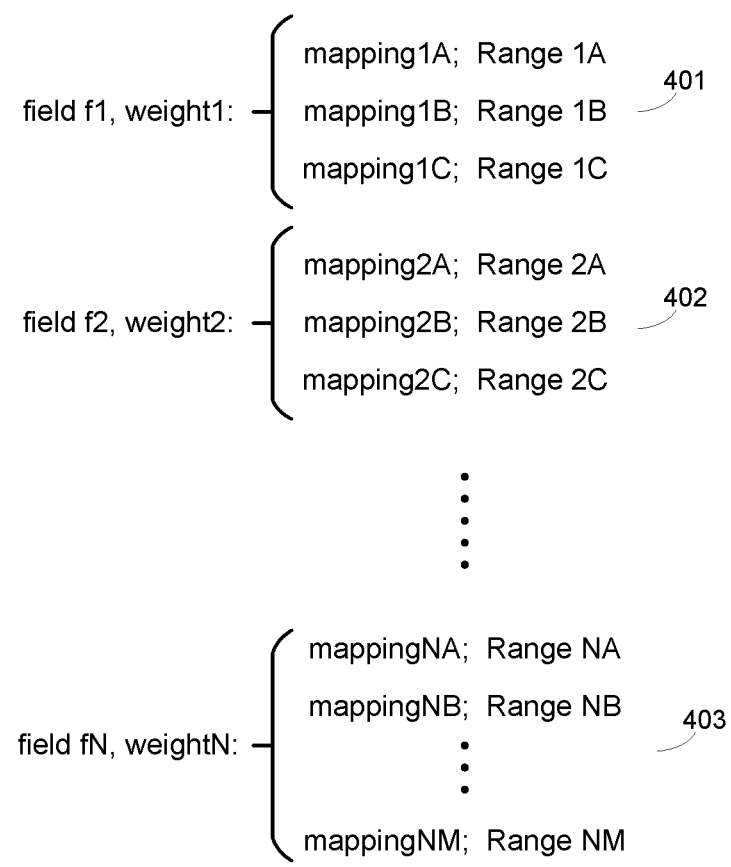
FIG. 4 illustrates fields with multiple mappings across multiple ranges according to an example embodiment.

FIG. 4 illustrates fields with multiple mappings across multiple ranges according to an example embodiment. Features and advantages of some embodiments of the present disclosure may include fields comprising a plurality of mappings for different ranges of user selected values for the field. For example, field f1 includes three mappings across three ranges as shown at 401. In this example, a first user input field f1 may have a weight (weight1) and be associated with three mappings across a range of values (e.g., Range of input values for f1=lower end of Range1A to upper range of Range1C, where Range 1B is an intermediate range). Across Range1A, mapping1A may convert values for field f1 to a first component value, for example. Similarly, across Range1B, mapping1B may convert values for field f1 to the first component value, and across Range1C, mapping1C may convert values for field f1 to the first component value, for example. Mapping1A, mapping1B and mapping1C may be different for different ranges, for example. In one embodiment, the mappings for numeric input fields may be slopes and intercepts. For example, a first slope and intercept may be used for mapping1A, a second slope and intercept may be used for mapping1B, and a third slope and intercept may be used for mapping1C. The following example is illustrative:

$f1=\{s1=1 \text{ and } b1=0, \text{ for } 0<f1<2; s2=2 \text{ and } b2=2, \text{ for } 2<=f1<4\}$, where si is the ith slope, bi is the ith intercept and f1=3 is mapped to 8 (i.e., s2(3)+b2).

As illustrated in FIG. 4, different user input fields may have different weights and different mappings across different ranges as shown at 402 and 403. For categorical input fields, the mappings may comprise a plurality of different values for different categories. As a simple example, "small" may be mapped to 5, "medium" may be mapped to 10, "large" may be mapped to 15, and "X-large" may be mapped to 20. It is to be understood that the above example mappings are illustrative and that other more complex mappings may be used.

Figure 5:
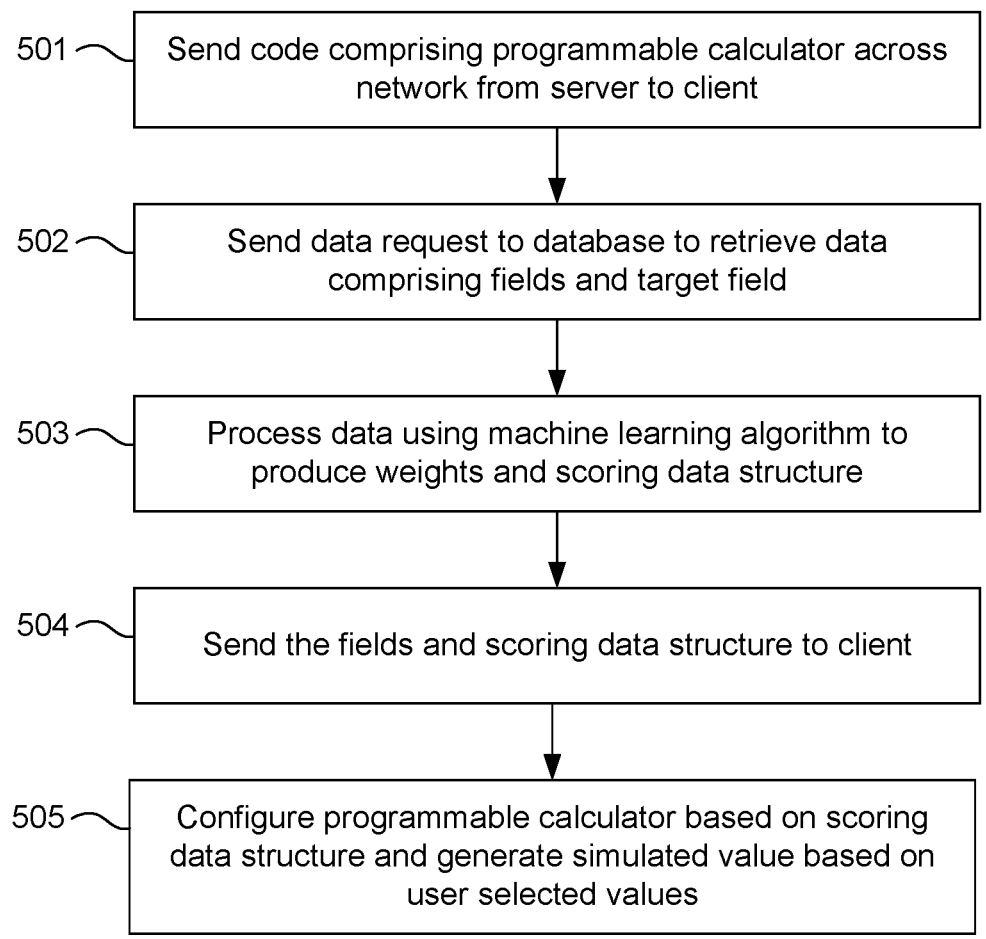
FIG. 5 illustrates a simulation method according to another embodiment.

FIG. 5 illustrates a simulation method according to another embodiment. For example, at 501, a server system may send code (e.g., JavaScript) comprising a programmable calculator to a client system across a network. At 502, a data request may be sent from the server system to a database, where the data request may be configured to retrieve data from the database comprising a plurality of fields and a target field. At 503, the retrieved data is processed using a machine learning algorithm to produce a weight for each field and a scoring data structure. At 504, the fields and the scoring data structure are sent to the client system across the network. At 505, a user selects values for the fields (e.g., input values) and the programmable calculator is configured based on the scoring data structure to generate a simulated value for the target field based on the user selected values.

Appendix A illustrates an example scoring data structure. Appendix B hereto illustrates an example programmable calculator.

Figure 6:
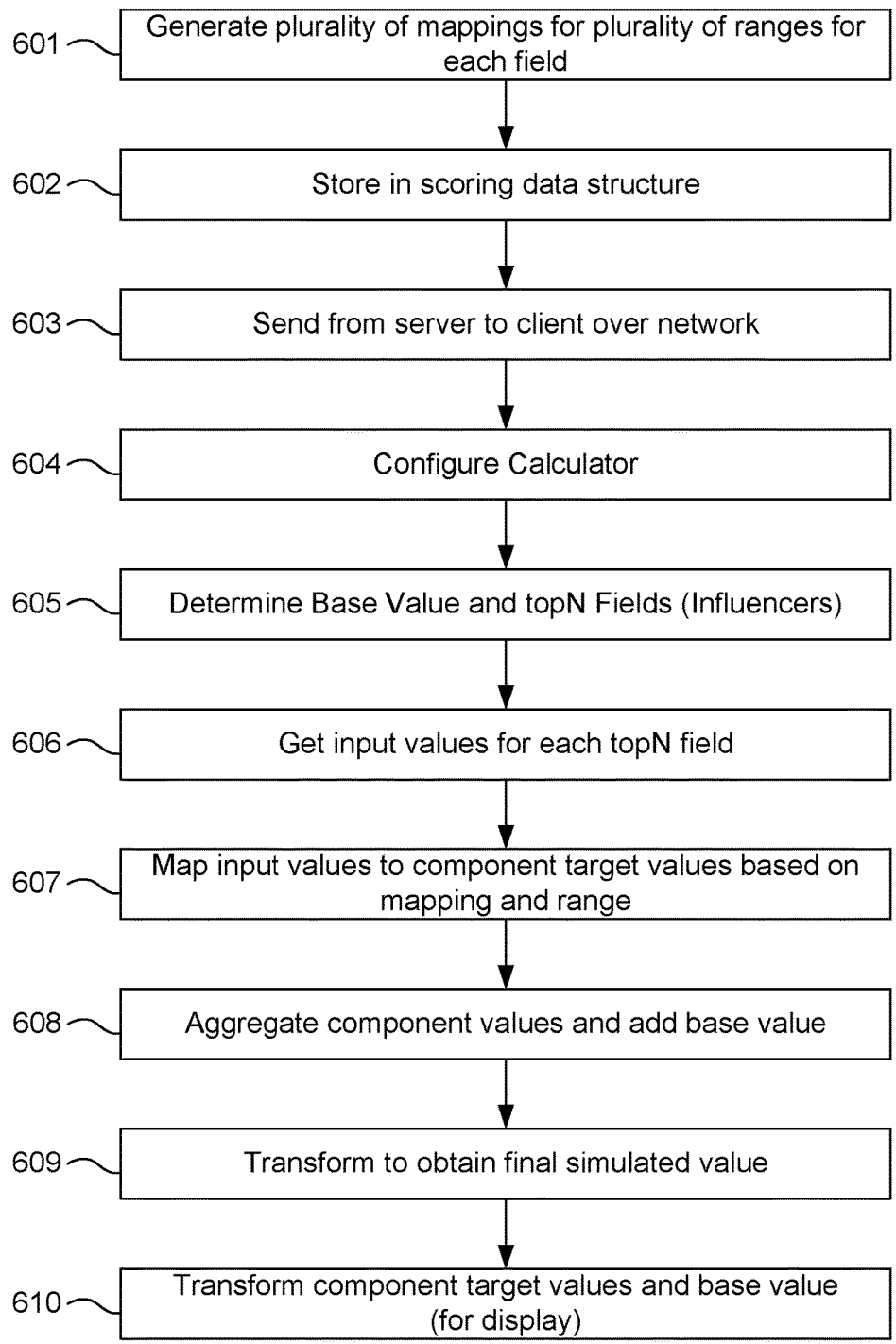
FIG. 6 illustrates another simulation method according to another example embodiment.

FIG. 6 illustrates another simulation method according to another example embodiment. The code in Appendix A and Appendix B may be one implementation example of the following method steps. At 601, a plurality of mappings for a plurality of ranges for fields are generated (e.g., by a machine learning algorithm). At 602, the mappings and ranges are stored in a scoring data structure in association with particular fields, which a user may select and configure as described above. At 603, the scoring data structure is sent from a server to a client over a network, for example. At 604, a calculator is configured with the information in the scoring data structure. At 605, a base value and top N fields may be determined. For example, the user may be presented with fields ranked by weights, where the weights correspond to how much each particular field influences the value of a target field. A user may select the top N fields as the fields to be used to simulate different values of the target field. Once the top N fields are known, a base value may be determined, where the base value may correspond to contributions of all the other non-top N fields together. For example, the other non-top N fields may be mapped to the base value. At 606, input values for each of the top N fields are received from a user. As described above, a user may enter numerical values (e.g., using a slider or data entry box) or categorical values (e.g., using a drop down menu, radio buttons, or similar mechanism). At 607, the input values may be mapped to component target values using mappings corresponding to each field, which in some examples may comprise different mappings based which range the input value for a particular field falls into. At 608, the component target values generated for each mapped input field, for example, may be aggregated and added to the base value (mentioned above). In some example embodiments, the aggregated component target values and base value may be transformed again at 609, based on another transformation specified in the scoring data structure, to obtain the final simulated value. In one embodiment, the transformation specified in the scoring data structure for transforming the aggregated component target values comprises a slope and intercept. At 610, the component target values may be transformed as at 609 so the final simulated values, component target values, and base value may be displayed together (e.g., in a waterfall chart). In other embodiments, other chart types may be used in addition to Waterfall Chart, such as a bar chart, a line chart, or even a simple Numeric Point chart (e.g., a chart that shows a numeric value as text, with certain styling formatting that allows for the number/chart to be read and interpreted easily by the user). Yet other embodiments may present animations and indications comparing a previous simulation to the current one, in real time as the user selects values in the client that are passed through the programmable calculator, for example.

Figure 7:
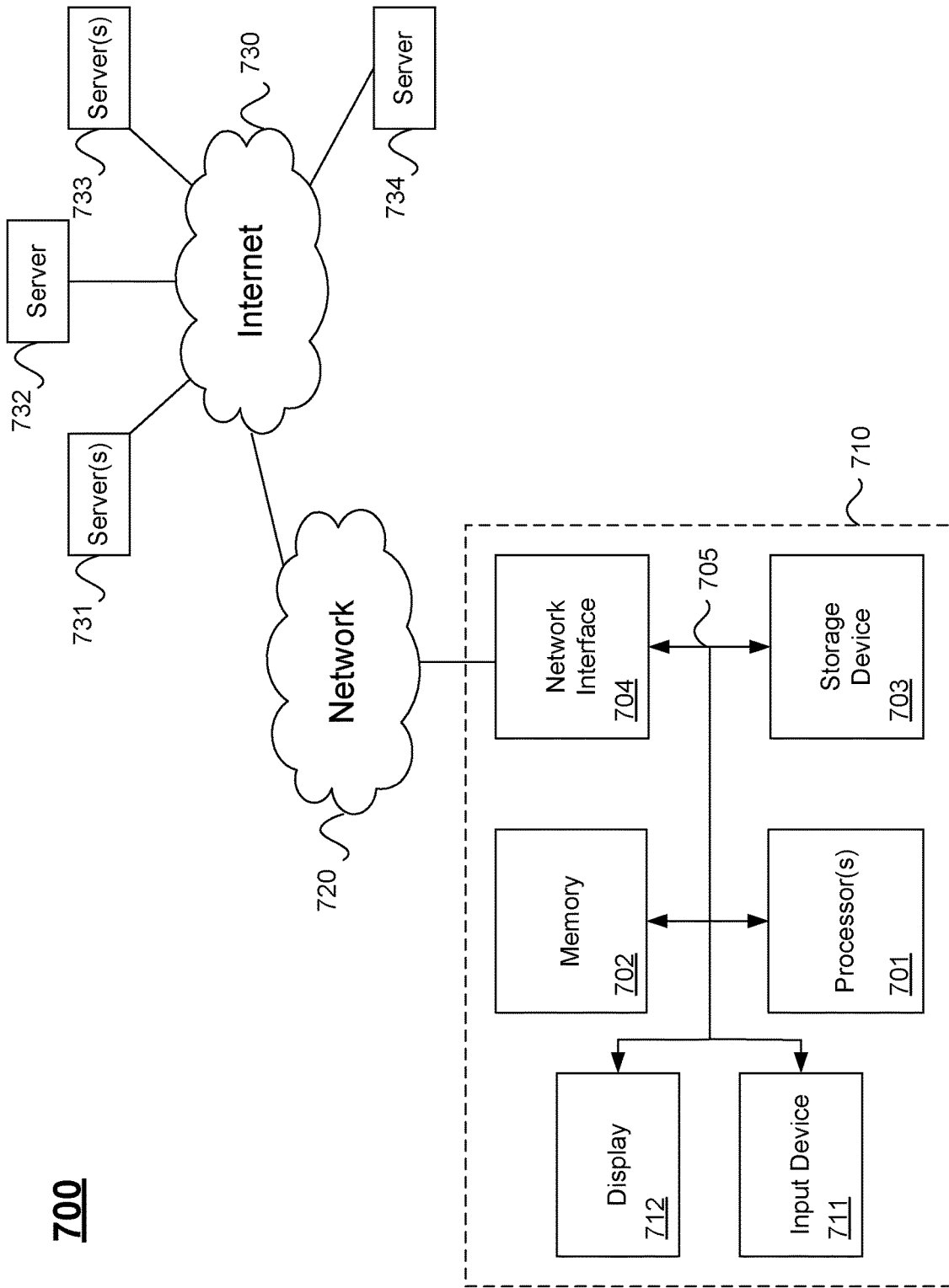
FIG. 7 illustrates computer system hardware configured according to the above disclosure.

FIG. 7 illustrates computer system hardware configured according to the above disclosure. The following hardware description is merely one illustrative example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. Computer system 710 also includes a memory 702 coupled to bus 705 for storing information and instructions to be executed by processor 701, including information and instructions for performing some of the techniques described above, for example. Memory 702 may also be used for storing programs executed by processor(s) 701. Possible implementations of memory 702 may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device 703 and memory 702 are both examples of non-transitory computer readable storage mediums.

Computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses for coupling various components of the computer together, for example.

Computer system 710 also includes a network interface 704 coupled with bus 705. Network interface 704 may provide two-way data communication between computer system 710 and a local network 720. Network 720 may represent one or multiple networking technologies, such as Ethernet, local wireless networks (e.g., WiFi), or cellular networks, for example. The network interface 704 may be a wireless or wired connection, for example. Computer system 710 can send and receive information through the network interface 704 across a wired or wireless local area network, an Intranet, or a cellular network to the Internet 730, for example. In some embodiments, a browser, for example, may access data and features on backend software systems that may reside on multiple different hardware servers on-prem 731 or across the Internet 730 on servers 732-735. One or more of servers 732-735 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

APPENDIX A

Example Scoring Data Structure ("Scoring Equation")

```
"scoringEquation": {
    "equation": [
        {
            "variable": "Cost of goods sold", - target
            "name": "PredictedCostOfGoodsSold",
            "outputType": "number",
            "transformations": [ - applied to sum of influencers result
                {
                    "min": "−INF",
                    "minIncluded": false,
                    "max": 30400.49634,
                    "maxIncluded": false,
                    "slope": 0.77,
                    "intercept": −2347.854
                }
                {
                    "min": 30400.49634,
                    "minIncluded": true,
                    "max": 42101,
                    "maxIncluded": false,
                    "slope": 0.75,
                    "intercept": −324.74
                }
                {
                    "min": 30400.49634,
                    "minIncluded": true,
                    "max": 42101,
                    "maxIncluded": false,
                    "slope": 0.75,
                    "intercept": −324.74
                }
            ],
            "influencers": ["c_Discounts", "c_Cellphone"] - ALL influencers/fields
        }
    ],
    "influencers": [
        {
            "encodedVariable": "c_Discounts", - continuous values
            "variable": "Discounts",
            "transformation": "AsIs",
            "storageType": "number",
            "valueType": "continuous",
            "encoding": [
```

APPENDIX A-continued

Example Scoring Data Structure ("Scoring Equation")

```
                {
                    "min": "−INF", - range 1
                    "minIncluded": false,
                    "max": −4434167.828,
                    "maxIncluded": true,
                    "slope": 0,
                    "intercept": 6214085.614
                },
                {
                    "min": −4434167.828, - range 2
                    "minIncluded": false,
                    "max": 100,
                    "maxIncluded": true
                    "slope": 1.2,
                    "intercept": 215.2 − user value*1.2 + 215.2
                },
                {
                    "min": 100, - range 3
                    "minIncluded": false,
                    "max": "INF",
                    "maxIncluded": false,
                    "slope": 0.34,
                    "intercept": 15.674
                }
            ],
            "missingValue": 528502.9222,
            "defaultValue": 528502.9222
            "missingString": null
        },
        {
            "encodedVariable": "c_CellPhone", - categorical
            "variable": "CellPhone",
            "transformation": "AsIs",
            "storageType": "string",
            "valueType": "nominal",
            "encoding": [
                {
                    "categories": ["Cell Phone provided"],
                    "encodedValue": 23.88111
                },
                {
                    "categories": ["Cell phone w/ roaming", "Cell phone w/o roaming"],
                    "encodedValue": 43.23
                }
            ],
            "missingValue": 26.45,
            "defaultValue": 13.72742,
            "missingString": null,
        }
    ]
}
```

APPENDIX B

Example Calculator Code

```
// Return Score and Contribution array contains contribution of each influencer
// scoringEquation is in json format comes from backend
// selectedInfluencers contains influencesrs and selected values for them from UI
function getScoreAndContribution(scoringEquation, selectedInfluencers, targetColumn)
{
        var baseValue = 0; // initialize non-top N fields base value
        var selectedInfluencersMap = _buildSelectedInfluencersMap(selectedInfluencers); // get input values from UI
        // build contribution array - stores info for each influencer
        var contributionArray = scoringEquation.influencers.map(function(influencer) {
            var contributionValue;
            var selectedInfluencer = selectedInfluencersMap[influencer.variable];
            if (!selectedInfluencer) { // If no value selected or it's not in top influencers
                baseValue += influencer.defaultValue; -- aggregate non-topN or unselected/no user input value to obtain base value
        }
```

APPENDIX B-continued

Example Calculator Code

```
            if (influencer.valueType === CONTINUOUS_INFLUENCER) { // numeric fields
                contributionValue = __getMeasureContribution(influencer,
                    selectedInfluencer && selectedInfluencer.value);
            } else if (influencer.valueType === NOMINAL_INFLUENCER) { // category fields
                contributionValue = __getDimensionContribution(influencer,
                    selectedInfluencer && selectedInfluencer.value);
            } else {
                showError("Unknown Influencer Type!");
            }
            return {
                "influencerName": influencer.variable,
                "influencerContribution": contributionValue, // user selected input
                "influencerValue": selectedInfluencer && selectedInfluencer.value // result of each influencer
            };
        });
        // calculate score based on contribution array - aggr to get final score
        var score = contributionArray.reduce(function(accumulator, currentValue) {
            return accumulator + currentValue.influencerContribution;
        }, 0);
        // update score based on target condition - apply scoring eq transform to get final final score
        var targetEquation = scoringEquation.equation.find(function(targetEquation) {
            return targetEquation.variable === targetColumn;
        });
        var targetCondition = __findMeasureCondition(targetEquation.transformations, score);
        var finalScore = __executeMeasureFormula(targetCondition, score);
        // update contribution array based on target transformation - update influencer values based on scoring eq transform for display
        contributionArray.forEach(function(contribution) {
            contribution.influencerContribution *= targetCondition.slope;
        });
        // add base value to the front of the contribution array.
        contributionArray.unshift({
            "influencerName": "Base Value",
            "influencerContribution": targetCondition.intercept + baseValue
        });
        return {
            score: finalScore,
            contributionArray: contributionArray
        };
}
// Gets the measure contribution - use user NUMERIC input to get relevant data from score eq
function __getMeasureContribution(influencer, measureValue) {
        // if measureValue is null or undefined, return default value
        if (measureValue === undefined || measureValue === null) {
            return influencer.defaultValue;
        }
        var conditions = influencer.encoding;
        var measureCondition = __findMeasureCondition(conditions, measureValue);
        if (!measureCondition) {
            showError("Unknown MeasureValue!");
            return 0;
        }
        return __executeMeasureFormula(measureCondition, measureValue);
}
// Gets the dimension contribution - use user CATEGORY selection input to get relevant data from score eq
function __getDimensionContribution(influencer, dimensionValue) {
        // if dimensionValue is null or empty string or undefined, return default value
        if (dimensionValue === undefined || dimensionValue === null ||
            dimensionValue === "") {
            return influencer.defaultValue;
        }
        var conditions = influencer.encoding;
        for (var i = 0; i < conditions.length; i++) {
            var condition = conditions[i];
            if (__existDimensionValue(condition.category, dimensionValue)) {
                return condition.encodedValue;
            }
        }
        showError("Unknown DimensionValue!");
        return 0;
}
```

APPENDIX B-continued

Example Calculator Code

```
// Find the matching condition for measureValue - Which range is the value in?
function __findMeasureCondition(conditions, measureValue) {
        for (var i = 0; i < conditions.length; i++) {
                var condition = condition[i];
                if (condition.category !== null && __isInRange(condition, measureValue)) {
                        return condition;
                }
        }
}
// Determine if measureValue is in condition range - Actual comparison of user input
value to bin ranges as safety check
function __isInRange(condition, measureValue) {
        var rangeMin = condition.min;
        var rangeMax = condition.max;
        if (measureValue > rangeMin && measureValue < rangeMax) {
                return true;
        }
        if (condition.minIncluded && measureValue === rangeMin) {
                return true;
        }
        if (condition.maxIncluded && measureValue === rangeMax) {
                return true;
        }
        return false;
}
function __executeMeasureFormula(condition, value) { -- Execute slope/intercept
mappings
        return condition.slope * value + condition.intercept;
}
// find if dimensionValue match the category - find output value for selected category
function __existDimensionValue(category, dimensionValue) {
        return dimensionValue === category ||
                Array.isArray(category) &&
                category.some((categoryValue) => categoryValue === dimensionValue);
}
// Builds selected influencers map
function __buildSelectedInfluencersMap(selectedInfluencers) {
    return selectedInfluencers.reduce(function(selectedInfluencersMap,
selectedInfluencer){
                selectedInfluencersMap[selectedInfluencer.variable] = selectedInfluencer;
                return selectedInfluencersMap;
    }, { });
}
```

What is claimed is:

1. A computer implemented method comprising:
sending, from a server system to a client system across a network, first code, the first code comprising a programmable calculator, the programmable calculator configured to generate a simulated value for a target field based on a scoring data structure and user selected values for a plurality of fields;
sending, from the server system to a database, a data request, the data request configured to retrieve data from the database comprising the plurality of fields and the target field;
processing the retrieved data using a machine learning algorithm to produce a weight for each field of the plurality of fields and the scoring data structure, each weight indicating a contribution of a corresponding field to the target field, the scoring data structure storing the weight for each field of the plurality of fields;
sending the plurality of fields and the scoring data structure to the client system across the network,
wherein the programmable calculator is configured to generate the simulated value for the target field based on the user selected values and the weight for each field of the plurality of fields stored in the scoring data structure.

2. The method of claim 1 wherein the scoring data structure comprises at least one mapping for each of the plurality of fields, wherein the mappings convert each user selected value for each of the plurality of fields into a component target value, and wherein the simulated value is based on the component target values.

3. The method of claim 2 further comprising:
aggregating the component target values; and
transforming the aggregated component target values based on a transformation specified in the scoring data structure.

4. The method of claim 3 wherein the transformation specified in the scoring data structure comprises a slope and intercept.

5. The method of claim 2 wherein at least one of the plurality of fields is a numeric field, and the mapping for the numeric field comprises a slope value and an intercept value.

6. The method of claim 2 wherein at least one of the plurality of fields is a categorical field, and the mapping for the categorical field comprises a plurality of different values for different categories.

7. The method of claim 2 wherein a first field of the plurality of fields comprises a plurality of mappings for different ranges of user selected values for the first field.

8. The method of claim 2 wherein the plurality of fields are top N fields having the largest weights, and wherein other fields not in the top N fields are mapped to a base value and combined with the component target values to obtain the simulated value.

9. The method of claim 2 wherein the scoring data structure is sent to the client in a JavaScript Object Notation (JSON) file or extended markup language (XML) file.

10. The method of claim 1 wherein the client system displays the simulated value for the target field and a plurality of values corresponding to contributions of each of the plurality of fields to the simulated value.

11. The method of claim 10 wherein the simulated value and the plurality of values are displayed in a waterfall chart.

12. The method of claim 1 wherein the first code is a web page and the programmable calculator is implemented in JavaScript in the web page.

13. The method of claim 1 wherein the target field is a target numerical field.

14. The method of claim 1 wherein the user selected values are for a top N weighted fields of the plurality of fields.

15. The method of claim 1 wherein the retrieved data is a table.

16. A non-transitory machine-readable medium storing a program executable by at least one processing unit of a computer, the program comprising sets of instructions for:
sending, from a server system to a client system across a network, first code, the first code comprising a programmable calculator, the programmable calculator configured to generate a simulated value for a target field based on a scoring data structure and user selected values for a plurality of fields;
sending, from the server system to a database, a data request, the data request configured to retrieve data from the database comprising the plurality of fields and the target field;
processing the retrieved data using a machine learning algorithm to produce a weight for each field of the plurality of fields and the scoring data structure, each weight indicating a contribution of a corresponding field to the target field, the scoring data structure storing the weight for each field of the plurality of fields;
sending the plurality of fields and the scoring data structure to the client system across the network,
wherein the programmable calculator is configured to generate the simulated value for the target field based on the user selected values and the weight for each field of the plurality of fields stored in the scoring data structure.

17. The non-transitory machine-readable medium of claim 16 wherein the scoring data structure comprises at least one mapping for each of the plurality of fields, wherein the mappings convert each user selected value for each of the plurality of fields into a component target value, and wherein the simulated value is based on the component target values.

18. A computer system comprising:
a processor; and
a non-transitory machine-readable medium storing a program executable by the processor, the program comprising sets of instructions for:
sending, from a server system to a client system across a network, first code, the first code comprising a programmable calculator, the programmable calculator configured to generate a simulated value for a target field based on a scoring data structure and user selected values for a plurality of fields;
sending, from the server system to a database, a data request, the data request configured to retrieve data from the database comprising the plurality of fields and the target field;
processing the retrieved data using a machine learning algorithm to produce a weight for each field of the plurality of fields and the scoring data structure, each weight indicating a contribution of a corresponding field to the target field, the scoring data structure storing the weight for each field of the plurality of fields;
sending the plurality of fields and the scoring data structure to the client system across the network,
wherein the programmable calculator is configured to generate the simulated value for the target field based on the user selected values and the weight for each field of the plurality of fields stored in the scoring data structure.

19. The computer system of claim 18 wherein the scoring data structure comprises at least one mapping for each of the plurality of fields, wherein the mappings convert each user selected value for each of the plurality of fields into a component target value, and wherein the simulated value is based on the component target values.

* * * * *